United States Patent
Newhall, Jr. et al.

(10) Patent No.: US 7,525,551 B1
(45) Date of Patent: Apr. 28, 2009

(54) ANISOTROPIC TEXTURE PREFILTERING

(75) Inventors: William P. Newhall, Jr., San Francisco, CA (US); James M. Van Dyke, Austin, TX (US)

(73) Assignee: Nvidia Corporation, Santa Clara, CA (US)

( * ) Notice: Subject to any disclaimer, the term of this patent is extended or adjusted under 35 U.S.C. 154(b) by 308 days.

(21) Appl. No.: 10/979,053

(22) Filed: Nov. 1, 2004

(51) Int. Cl.
*G09G 5/00* (2006.01)
(52) U.S. Cl. ..................................... 345/587
(58) Field of Classification Search ................. 345/587, 345/582–586
See application file for complete search history.

(56) References Cited

U.S. PATENT DOCUMENTS

| | | | | |
|---|---|---|---|---|
| 5,790,130 | A | * | 8/1998 | Gannett ....................... 345/587 |
| 6,636,227 | B1 | * | 10/2003 | Rivard et al. ................. 345/582 |
| 2006/0158451 | A1 | * | 7/2006 | Barenbrug et al. .......... 345/582 |
| 2006/0232598 | A1 | * | 10/2006 | Barenbrug et al. .......... 345/582 |

* cited by examiner

*Primary Examiner*—Kee M Tung
*Assistant Examiner*—Aaron M Richer
(74) *Attorney, Agent, or Firm*—Townsend and Townsend and Crew LLP (57) ABSTRACT

Ripmapping and footprint assembly are used to anisotropically filter texture maps. A subset of the set of ripmaps associated with a base texture is created and stored. The subset includes ripmaps selected to maximize anisotropic texture sampling performance and to minimize the texture memory requirements. For pixel footprints not aligned with the anisotropy of ripmaps or requiring a ripmap outside of the subset, footprint assembly is used to perform anisotropic filtering by taking multiple isotropic probes from a mipmap. For texture samples aligned within a tolerance range of the anisotropy of a ripmap, footprint assembly constructs an anisotropic texture sample from one or more samples of a ripmap. Ripmap statistics are collected during texture mapping to dynamically determine an optimal subset of ripmaps, and additional ripmaps can be added to the subset on demand if warranted. A graphics driver can analyze ripmap statistics to determine the subset of ripmaps.

23 Claims, 7 Drawing Sheets

FIG. 5 ers in the art. The invention will be described with reference to

ANISOTROPIC TEXTURE PREFILTERING

BACKGROUND OF THE INVENTION

The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem. Typically, the CPU performs high level operations, such as determining the position, motion, and collision of objects in a given scene. From these high level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

Texture mapping is the process of applying color or transparency information in a two-dimensional image, referred to as a texture map or texture, to all or a portion of a surface in three-dimensional space. Visually, texture mapping "wraps" a flat image on to a three-dimensional surface or object.

One problem with texture mapping arises from alias artifacts. Rendered images are typically comprised of a number of individual pixels, each having a color value determined from a corresponding portion of three-dimensional scene. For pixels corresponding to the surface with the texture map, each pixel may represent any number of texture map pixels (or texels), depending upon the orientation of the surface with reference to the viewer. For example, when a surface is close to the viewer, multiple pixels of a rendered image may correspond with a single texel. This is referred to as texture magnification. Conversely, when the surface is very distant from the viewer, a pixel may correspond with multiple texels. This is referred to as texture minification. As a texture is minified, if the pixel does not sample and filter the texture map appropriately for a given surface orientation, visual aliasing artifacts will appear in the rendered image.

Prior texture filtering techniques, such as trilinear mipmapping, compute an array of prefiltered representations of the texture known as a mipmap pyramid. Each successive image in the array, or "mipmap level" is a representation of the original texture image isotropically filtered to a constant degree of minification such that each texel in the mipmap level is a weighted average of the corresponding texels of the base miplevel for a pixel at the corresponding degree of minification, or "level of detail". When rendering pixels with the mipmap, the renderer computes the degree of minification, or "level of detail" which conservatively approximates the footprint of the pixel in texture space and computes a filtered texture by fetching and weighting, and accumulating texel values from mipmap or mipmaps that have closest corresponding level of detail. This effectively computes a weighted average of the texels of the original texture image using a small number of fetch and filter operations from a precomputed mipmap instead of fetching and filtering a potentially large number of texels from the original image.

Isotropic filtering approximates the pixel footprint as a circle in texture image space and as such filters texture maps equally in all directions. These techniques address the problem of sampling minified textures for textured surfaces roughly parallel to the image plane. However, these techniques perform poorly for surfaces having a large range of depth values over the surface, such as surfaces orientated perpendicular to the image plane. Isotropic filtering gives textures on these surfaces a blurry or out of focus appearance.

Anisotropic texture filtering, or filtering textures unequally in different directions, prevents aliasing and avoids the blurring introduced by the overly conservative approximation of the pixel footprint employed by isotropic texture filtering. Unfortunately, prior anisotropic filtering techniques substantially reduce rendering performance. Footprint assembly techniques use a more accurate approximation of an elliptical pixel footprint by taking multiple isotropic probes along the major axis of the ellipse. Anisotropic filtering via footprint assembly requires multiple isotropic probes at higher resolutions than isotropic filtering which only requires isotropic probe. Thus anisotropic filtering via footprint assembly is considerably slower than isotropic filtering. For example, footprint assembly techniques combine a large number of isotropic probes to compute a single anisotropic filter value. The large number of isotropic probes required, increases the number of texture memory accesses, thereby decreasing rendering performance. Ripmapping, another known technique, computes the complete set of rectangular mipmap pyramids with different aspect ratios at powers of two (for example, a 16×16 texture map would require a ripmap consisting of mipmap pyramids of 16×8, 16×4, 16×2, 16×1, 8×16, 4×16, 2×16, and 1×16). Filtering a footprint with ripmaps involves computing the squash, or ratio of horizontal to vertical minification of the pixel footprint in the texture space and taking a single isotropic probe from the appropriate mipmap pyramid. The large number of mipmap pyramids for each texture requires a large amount of additional texture memory. For example, using ripmapping increases the amount of texture memory required by four. Additionally, ripmapping is typically ineffective if the line of anisotropy of the pixel footprint is not aligned with a direction of anisotropy.

It is therefore desirable for a system and method to improve the performance of anisotropic texture filtering. It is also desirable to minimize the amount of extra texture memory required for anisotropic texture filtering and to optimize anisotropic texture filtering for specific applications. It is further desirable to improve the performance of anisotropic texture filtering regardless of the direction of anisotropy.

BRIEF SUMMARY OF THE INVENTION

An embodiment of the invention uses both ripmapping and footprint assembly to optimize anisotropic filtering of texture maps. A subset of the set of ripmaps associated with a base texture is created and stored. The subset includes ripmaps to maximize anisotropic texture filtering performance and minimize the required amount of texture memory. For pixel footprints not aligned with the anisotropy of ripmaps or requiring a ripmap outside of the subset, footprint assembly is used to sample the line of anisotropy from one or more samples of a mipmap or ripmap. For texture samples aligned within a tolerance range of the anisotropy of a ripmap, footprint assembly samples from one or more samples of a ripmap. Ripmap statistics are collected during texture mapping to dynamically determine an optimal subset of ripmaps, and additional ripmaps can be added to the subset on demand if warranted. A graphics driver can analyze ripmap statistics to determine the subset of ripmaps.

In an embodiment, an anisotropic texture sample value is computed by measuring the squash value representing a desired amount of anisotropy for an anisotropic texture sample. The squash value is used to select a texture map. The selected texture map is a ripmap included in a set of potential ripmaps associated with a base texture and having the desired amount of anisotropy. In response to a determination that the selected texture map is not included in a set of available ripmaps, an alternate texture map is chosen as the selected texture map. In a further embodiment, the determination that the selected texture map is not included in a set of available ripmaps includes an analysis of a bit mask enumerating an availability of each one of the set of potential ripmaps. The alternate texture map is an alternate ripmap with a lower degree of squash included in the set of available ripmaps. The embodiment modifies a texture state value to match an attribute of the selected texture map, and the selected texture map is sampled to determine the anisotropic texture sample value.

In an additional embodiment, the squash value is computed from the texture coordinates associated with a group of texture samples. In another embodiment, a texture map is selected with reference to the orientation of the anisotropic texture sample. In a further embodiment, the texture state value may be a texture base address, a texture map width, or a texture map height.

In a further embodiment, the anisotropic texture sample value is determined from a plurality of texture samples from the selected texture map. In this embodiment, the plurality of texture samples are arranged to approximate the anisotropic texture sample.

In yet another embodiment, a new ripmap is created from the set of potential ripmaps associated with the base texture and is added to the set of available ripmaps. In yet a further embodiment, a set of ripmap statistics associated with the set of potential ripmaps is updated in response to the selecting the texture map using the squash value. The new ripmap is created and added to the set of available ripmaps in response to an analysis of the set of ripmap statistics. The analysis of the set of ripmap statistics may include determining whether at least one of the set of ripmap statistics exceeds a threshold value. The threshold value may be based upon a relative visual benefit associated with at least one of the set of potential ripmaps or upon a size of at least one of the set of potential ripmaps.

BRIEF DESCRIPTION OF THE DRAWINGS

The invention will be described with reference to the drawings, in which.

DETAILED DESCRIPTION OF THE INVENTION

Figure 1:
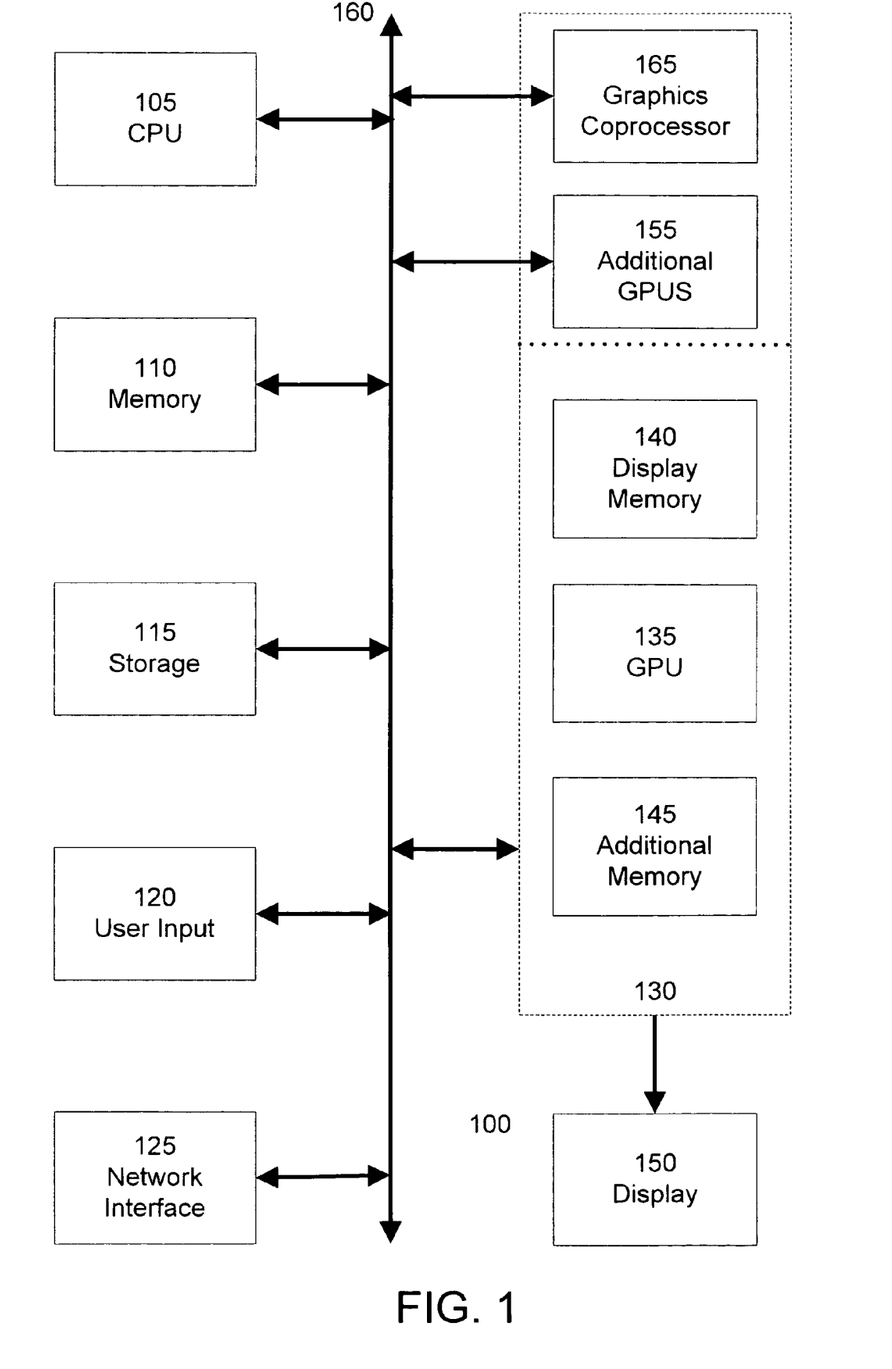
FIG. 1 is a block diagram of a computer system suitable for practicing an embodiment of the invention.

FIG. 1 is a block diagram of a computer system 100, such as a personal computer, video game console, personal digital assistant, or other digital device, suitable for practicing an embodiment of the invention. Computer system 100 includes a central processing unit (CPU) 105 for running software applications and optionally an operating system. In an embodiment, CPU 105 is actually several separate central processing units operating in parallel. Memory 110 stores applications and data for use by the CPU 105. Storage 115 provides non-volatile storage for applications and data and may include fixed disk drives, removable disk drives, flash memory devices, and CD-ROM, DVD-ROM, or other optical storage devices. User input devices 120 communicate user inputs from one or more users to the computer system 100 and may include keyboards, mice, joysticks, touch screens, and/or microphones. Network interface 125 allows computer system 100 to communicate with other computer systems via an electronic communications network, and may include wired or wireless communication over local area networks and wide area networks such as the Internet. The components of computer system 100, including CPU 105, memory 110, data storage 115, user input devices 120, and network interface 125, are connected via one or more data buses 160. Examples of data buses include ISA, PCI, AGP, PCI, PCI-X (also known as 3GIO), and Hypertransport data buses.

A graphics subsystem 130 is further connected with data bus 160 and the components of the computer system 100. The graphics subsystem 130 includes a graphics processing unit (GPU) 135 and graphics memory. Graphics memory includes a display memory 140 (e.g., a frame buffer) used for storing pixel data for each pixel of an output image. Pixel data can be provided to display memory 140 directly from the CPU 105. Alternatively, CPU 105 provides the GPU 135 with data and/or commands defining the desired output images, from which the GPU 135 generates the pixel data of one or more output images. The data and/or commands defining the desired output images is stored in additional memory 145. In an embodiment, the GPU 135 generates pixel data for output images from rendering commands and data defining the geometry, lighting, shading, texturing, motion, and/or camera parameters for a scene.

In another embodiment, display memory 140 and/or additional memory 145 are part of memory 110 and is shared with the CPU 105. Alternatively, display memory 140 and/or additional memory 145 is one or more separate memories provided for the exclusive use of the graphics subsystem 130. The graphics subsystem 130 periodically outputs pixel data for an image from display memory 218 and displayed on display device 150. Display device 150 is any device capable of displaying visual information in response to a signal from the computer system 100, including CRT, LCD, plasma, and OLED displays. Computer system 100 can provide the display device 150 with an analog or digital signal.

In a further embodiment, graphics processing subsystem 130 includes one or more additional GPUs 155, similar to GPU 135. In an even further embodiment, graphics processing subsystem 130 includes a graphics coprocessor 165. Graphics processing coprocessor 165 and additional GPUs 155 are adapted to operate in parallel with GPU 135. Additional GPUs 155 generate pixel data for output images from rendering commands, similar to GPU 135. Additional GPUs 155 can operate in conjunction with GPU 135 to simultaneously generate pixel data for different portions of an output image, or to simultaneously generate pixel data for different output images. In an embodiment, graphics coprocessor 165 performs rendering related tasks such as geometry transformation, shader computations, and backface culling operations for GPU 135 and/or additional GPUs 155.

Additional GPUs 150 can be located on the same circuit board as GPU 135 and sharing a connection with GPU 135 to data bus 160, or can be located on additional circuit boards separately connected with data bus 160. Additional GPUs 155 can also be integrated into the same module or chip package as GPU 135. Additional GPUs 155 can have their own display and additional memory, similar to display memory 140 and additional memory 145, or can share memories 140 and 145 with GPU 135. In an embodiment, the graphics coprocessor 165 is integrated with the computer system chipset (not shown), such as with the Northbridge or Southbridge chip used to control the data bus 160.

Figure 2A:
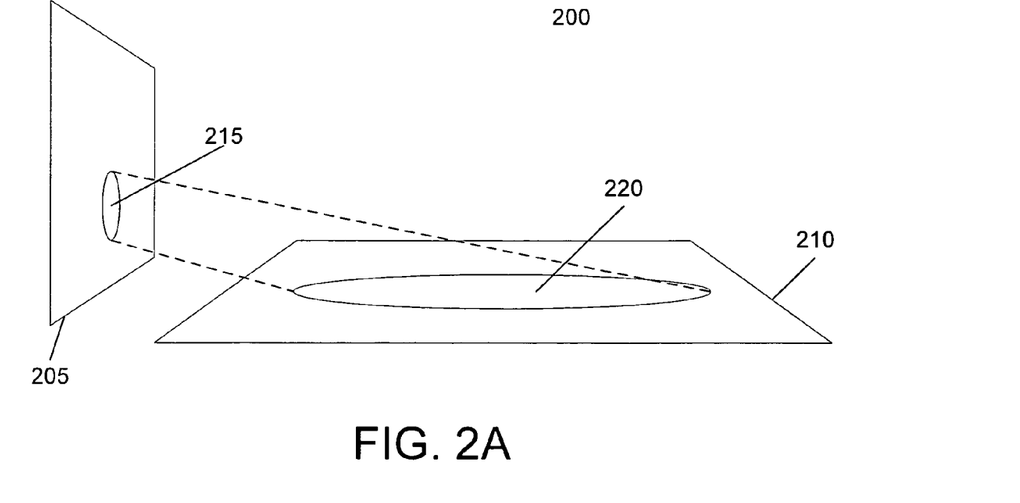
FIGS. 2A-2D illustrate anisotropic texture sampling and prior implementations anisotropic texture filtering.

FIGS. 2A-2D illustrate anisotropic texture sampling and prior implementations of anisotropic texture filtering. FIG. 2A illustrates a scene 200 with an image plane 205 roughly perpendicular with a texture mapped surface 210. A pixel 215 on the image plane 205 represents a roughly circular region of the rendered image. To determine the value of the pixel 215 from the texture mapped surface 210, the pixel 215 is projected from the image plane on to the texture mapped surface 210. The projection of pixel 215 on the texture mapped surface 210 forms a pixel footprint 220 in the texture space. In the example of FIG. 2A, the pixel footprint 220 is an elliptical region in texture space corresponding with the circular region of pixel 215 in the image plane 205. The value of the pixel 215 is thus determined by sampling texels in the elliptical pixel footprint 220.

Figure 2B:
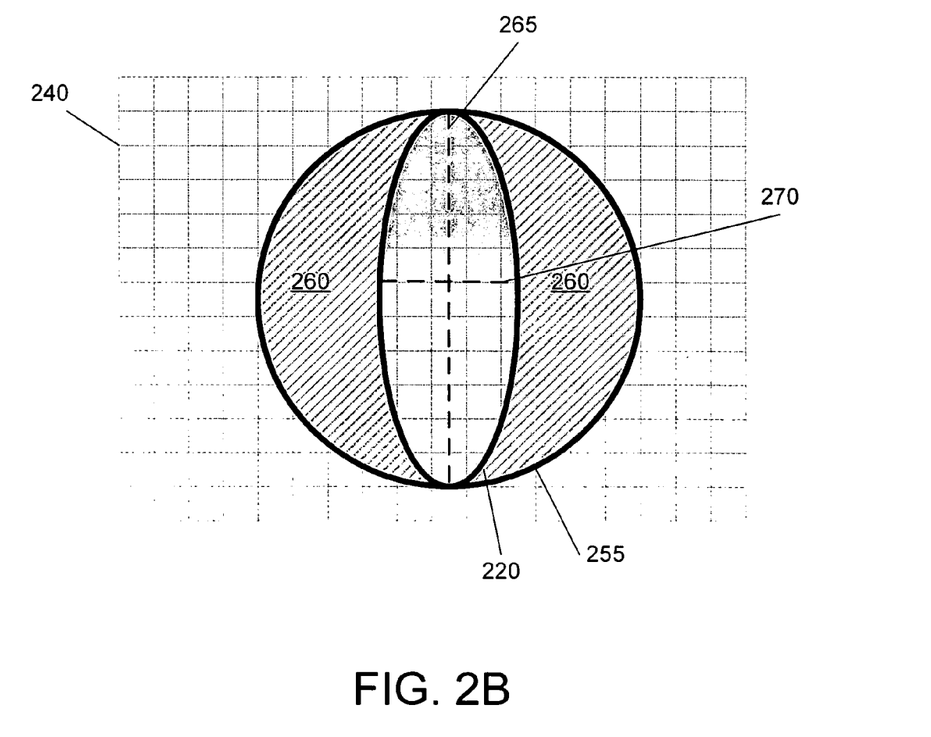

FIG. 2B illustrates an overhead view of the texture map 240 of texture mapped surface 210, discussed in FIG. 2A. Ideally, the pixel 215 samples texels only within pixel footprint 220. However, isotropic texture sampling techniques, such as mipmapping, require that a texture map is sampled equally along both dimensions. For isotropic texture sampling, the pixel footprint is distorted from the elliptical shape of pixel footprint 220 to the circular isotropic footprint 255. Isotropic footprint 255 includes all of the texels within pixel footprint 220. In addition, isotropic footprint 255 also samples texels in excess region 260. The sampling of texels in excess region 260 causes the texture map to appear blurred.

To prevent blurring from isotropic texture sampling, only texels from within the pixel footprint 220 should be sampled to determine the value of pixel 215. Anisotropic texture sampling thus samples a larger number of texels along the major axis 265 of the elliptical pixel footprint 220, referred to as the axis of anisotropy, than along the minor axis 270 of the elliptical pixel footprint 220.

Figure 2C:
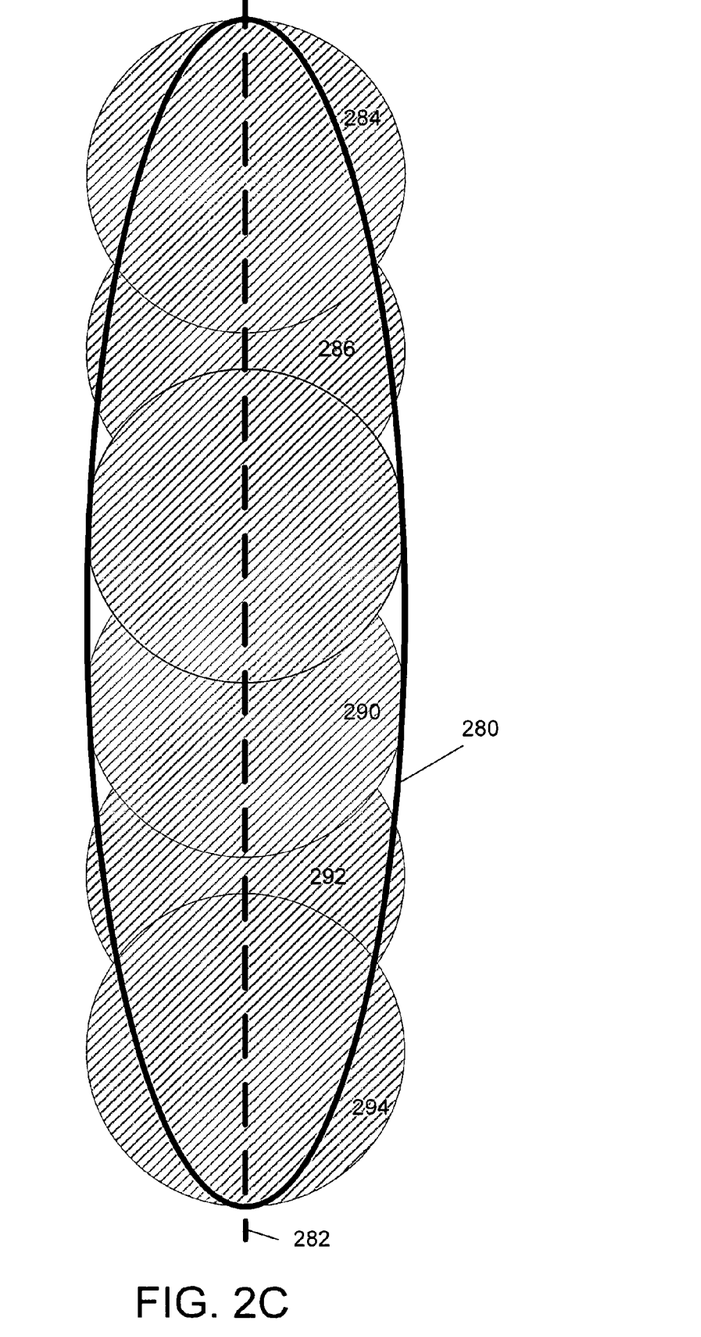

There are several different techniques for anisotropic texture sampling. FIG. 2C illustrates the technique of footprint assembly to anisotropically sample a texture map. An elliptical pixel footprint 280 represents a pixel from the image plane projected on to the texture space. Pixel footprint 280 has an axis of anisotropy 282. A set of circular, isotropic texture samples, such as isotropic texture samples 284, 286, 288, 290, 292, and 294, is arranged along the axis of anisotropy 282. Each isotropic texture sample may sample one or more texels of the texture map to determine a corresponding isotropic sample value.

The set of texels sampled by the set of isotropic texture samples should approximately equal the set of texels within the pixel footprint 280. Footprint assembly combines the isotropic sample values to determine an approximate anisotropic sample value for the pixel footprint 280. Although footprint assembly provides a good approximation of the actual anisotropic sample value of pixel footprint 280, it requires a large number of isotropic texture samples, which substantially reduces rendering performance.

Figure 2D:
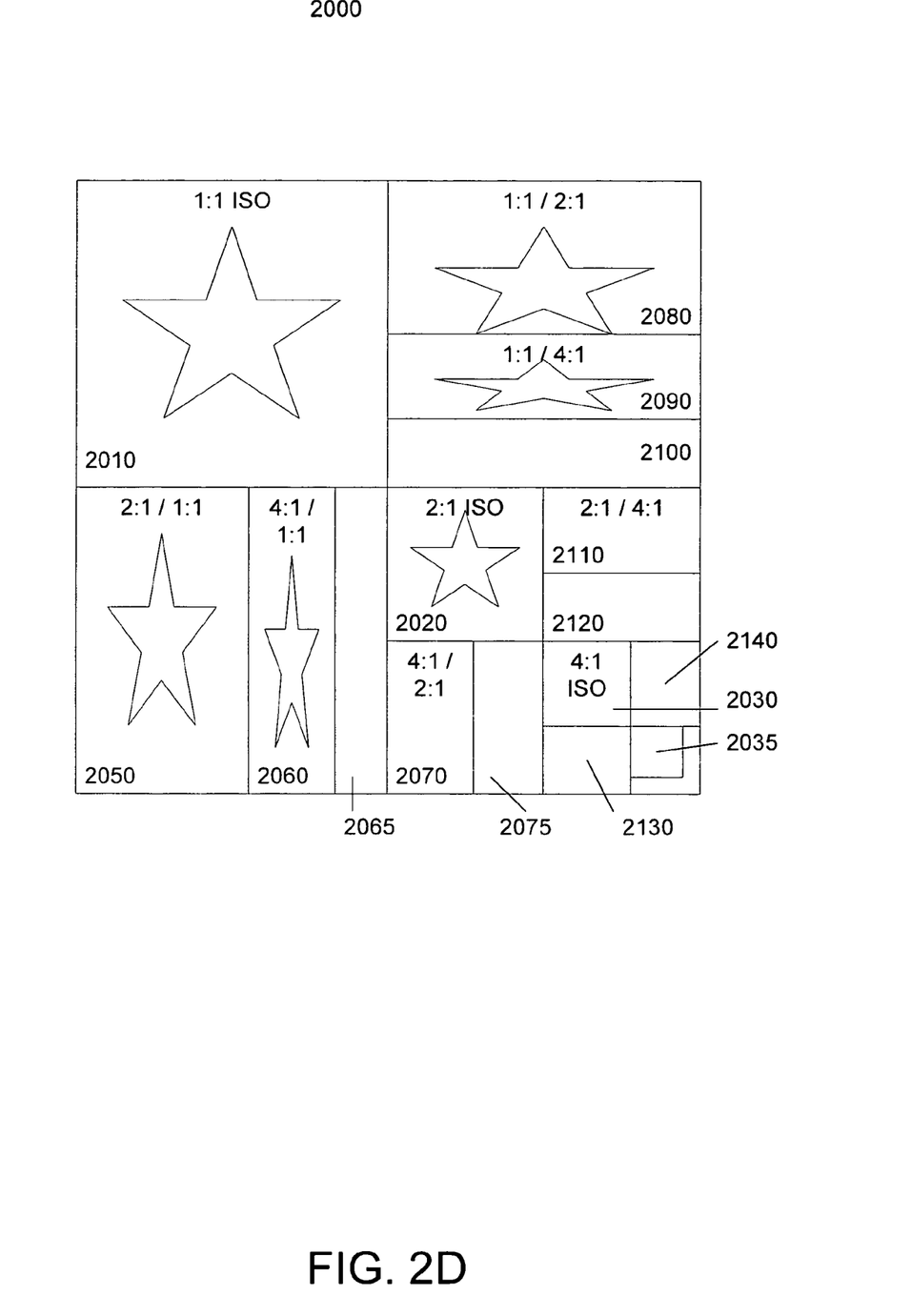

FIG. 2D illustrates an alternate anisotropic filtering technique of ripmapping. Ripmapping is similar to mipmapping in that multiple filtered versions of a texture map are precomputed prior to rendering. However, in ripmapping, the texture maps are filtered anisotropically.

Texture set 2000 illustrates a base texture 2010 and its associated prefiltered counterparts, both for conventional mipmapping and for ripmapping. For mipmapping, base texture 2010 is downsampled equally in both dimensions to create mipmaps including 2:1 mipmap 2020, 4:1 mipmap 2030, and additional mipmaps 2035. Additional mipmaps 2035 may include further minified versions of the base texture 2010 down to the size of a single texel. In an embodiment, a box filter is used to filter texels to create each mipmap from either the base texture 2010 or iteratively from the immediately preceding mipmap.

To determine the value of a pixel corresponding to a texture mapped surface using mipmapping, a minification level is determined based upon the relative ratio between a pixel in the image plane and a corresponding number of texels in the texture map. The minification level is used to select adjacent mipmaps, which are then sampled and combined to determine the value of the pixel. Essentially, mipmapping precomputes the value of each pixel footprint at varying levels of texture minification. These precomputed values are then used to determine the value of a pixel footprint for any arbitrary amount of texture minification.

For example, if the orientation of the texture mapped surface relative to the image plane results in a ratio, for a given pixel or group of pixels, three texels sampled by each pixel, or a minification level 3:1, adjacent mipmaps 2020 and 2030, having a ratios of 2:1 and 4:1, respectively are selected. In the case of tri-linear mipmapping, the value of the pixel is then determined by a weighted average of four texels from mipmap 2020 and one texel from mipmap 2030.

For ripmapping, the base texture 2010 is downsampled is unequally in different directions to create ripmaps, which are versions of the base texture 2010 filtered with varying amounts of anisotropy. Ripmaps 2050 and 2060 downsample base texture 2010 horizontally, while leaving the vertical dimension of the base texture untouched. In an embodiment, ripmaps are created by applying a box filter in the dimension of anisotropy to further minify the texture. Ripmaps 2050 and 2060 have horizontal minification ratios of 2:1 and 4:1, respectively, and a 1:1 vertical minification ratio. Additional ripmaps 2065 may include further horizontally minified versions of the base texture 2010 down to the width of a single texel. Similarly, ripmaps 2080 and 2090 have vertical minification ratios of 2:1 and 4:1 respectively, and a horizontal minification ratio of 1:1. Additional ripmaps 2100 may include further vertically minified versions of the base texture 2010 down to the height of a single texel.

Ripmaps 2050, 2060, 2065, 2080, 2090, and 2100 each have one dimension at a 1:1 minification. As such, each can be viewed as an anisotropic version of base texture 2010. Similarly, ripmaps 2070, 2075, 2110 and 2120 each have one dimension at a minification level of 2:1 and can be viewed as anisotropic versions of the mipmap 2020, which has a minification of 2:1. For example, ripmap 2070 can be viewed as a version of mipmap 2020 being further minified horizontally, resulting in a horizontal minification of 4:1 and a 2:1 vertical minification. Similarly, ripmap 2110 has a vertical minification of 4:1 and a 2:1 horizontal minification.

Additional ripmaps 2075 may include further horizontally minified versions of mipmap 2020, down to the width of a single texel, and additional ripmaps 2120 may include further vertically minified versions of mipmap 2020, down to the height of a single texel. For further mipmaps, such as mipmaps 2035 and 2030, corresponding sets of mipmaps can be created.

To determine the value of a pixel corresponding to a texture mapped surface using ripmapping, a level of anisotropy is determined based upon the amount of texture minification in each dimension. The level of anisotropy is used to select one or more ripmaps having similar ratios of anisotropy. The selected ripmap is then sampled to determine the value of the pixel. Essentially, ripmapping precomputes the value of each pixel footprint at varying levels of texture anisotropy. Each ripmap corresponds with a version of the texture map "stretched" to match the elliptical shape of anisotropic pixel footprint. Thus, sampling from a circular footprint of a ripmap corresponds with a sample from an elliptical anisotropic pixel footprint from the "unstretched" base texture or mipmap. Ideally, ripmapping allows for the computation of an anisotropic texture sample with only a single texture sample, thereby offering improved performance over footprint assembly. However, as shown in FIG. 2D, a single base texture may have a large number of ripmaps. For example, texture set 2000 with a full set of ripmaps for base texture 2010 will require four times the memory of the base texture. Additionally, as a new base texture is loaded into memory, a corresponding set of ripmaps will need to be generated, which takes some amount of time. Furthermore, ripmapping as illustrated in FIG. 3D is only effective when the axis of anisotropy is aligned with either the horizontal or vertical dimension of the texture. For pixel footprints in other orientations, the pixel footprint does not match up with the direction of anisotropy precomputed in the ripmaps.

Figure 3:
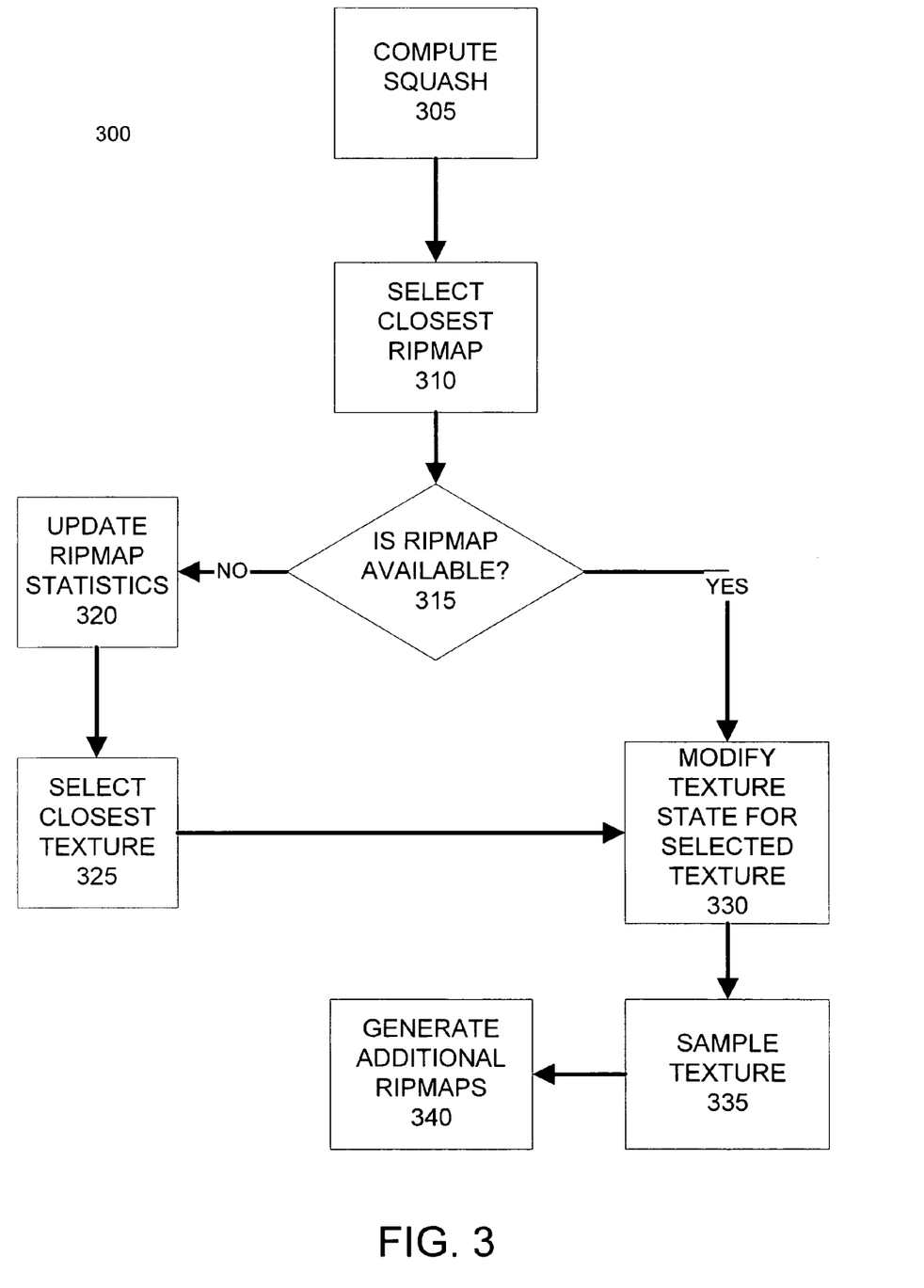
FIG. 3 is a block diagram illustrating a method of anisotropic texture filtering according to an embodiment of the invention.

FIG. 3 is a block diagram illustrating a method 300 of anisotropic texture sampling according to an embodiment of the invention. At step 305, method 300 determines a "squash" value for a given pixel or set of pixels. The squash value is an approximation of the level of anisotropy across the pixel or set of pixels. In an embodiment, method 300 processes four adjacent pixels arranged in a two-by-two "quad" simultaneously. In this embodiment, texture coordinates are associated with each pixel and the squash is the ratio of differences in texture coordinates for the horizontal and vertical components of the line of anisotropy in texture space. Alternate embodiments may process any number of pixels simultaneously, and may determine the squash by other means.

At step 310, a ripmap is selected based upon the squash value. In an embodiment, the selected ripmap is the ripmap having the closest amount of anisotropy to the squash value. In a further embodiment, the ripmap is selected from any of the potential ripmaps associated with a base texture map as illustrated in FIG. 2D.

Step 315 determines whether the selected ripmap has been created and is available for use. In an embodiment, only a portion of the potential ripmaps for a base texture map are precomputed. This substantially reduces the amount of memory required to store ripmaps associated with a base texture. In this embodiment, a portion of the potential ripmaps are created as a base texture map is loaded into memory. In a further embodiment, additional ripmaps are added only as needed by rendering, as discussed in detail below.

In an additional embodiment, step 315 uses a bit mask to determine whether the selected ripmap is available for texture mapping. The bit mask has a bit value associated with each of the potential ripmaps as illustrated in FIG. 2D. Each bit value indicates whether the associated ripmap has been created and is available for texturing. A different bit mask is associated with each base texture and its corresponding set of ripmaps, thus indicating for each base texture which portion of the associated ripmaps in the texture set are available for texture mapping.

If step 315 determines that the selected ripmap is not available for texture mapping (e.g. the selected ripmap has not been computed), step 320 updates a set of ripmap statistics accordingly. In an embodiment, each texture set includes statistics tracking how often each of its associated ripmaps is selected by step 310. The statistics can be a set of counters corresponding with each of the potential ripmaps in the texture set, or a more complex measure of the frequency and/or recency of ripmap selection, such as a variance or a weighted average.

Step 325 selects an alternate texture map from the available texture maps associated with the base texture. In an embodiment, step 325 selects a mipmap having a level of minification closest to the level of anisotropy specified by the squash value. For example, if a ripmap of 8:1/2:1 is selected by step 310, but is determined by step 315 to be unavailable, a mipmap having an 2:1 minification in both dimensions is selected by 325.

In an alternate embodiment, step 325 selects either a mipmap or a different available ripmap closest to the level of anisotropy specified by the squash value and the orientation of the axis of anisotropy. For example, if a ripmap of 8:1/1:1 is selected by step 310, but is determined by step 315 to be unavailable, an available ripmap of 2:1/1:1 is selected if the axis of anisotropy is within a threshold range of the vertical. Alternatively, if the axis of anisotropy is outside the threshold range, for example along the 45 degree diagonal, a mipmap having a minification of 1:1 is selected instead.

If step 315 determines that the selected ripmap is available or following the selection of an alternate texture map in step 315, step 330 modifies the texture state values associated with the texture to match the selected texture map. In an embodiment, texture state values specify the properties of the texture map to be used for a given pixel or group of pixels. Texture state variables may include a texture base address, a texture width and texture length, a stride value, which is the offset between similar texture positions in adjacent scan lines, memory parameters, such as whether the texture is stored in tiled memory, and texel parameters, such as the data format used to describe texel values.

Step 330 modifies the texture state values to match the parameters of the selected texture map. In an embodiment, step 330 modifies the texture base address, texture width, and texture length to the base address, texture width, and texture length of the selected texture map. In the case where the selected texture map is a ripmap, the texture length and width will be changed to match the dimensions of the ripmap and hence reflect the level of anisotropy. At step 335, the selected texture is sampled to determine the value of the pixel or group of pixels. If the selected texture is the ripmap selected by step 310, then step 335 only needs to sample the selected texture once to determine the value of the pixel. If the selected texture is a mipmap as selected by step 325, then an embodiment of step 335 falls back to a footprint assembly technique using multiple samples from the selected texture map to approximate an anisotropic texture sample.

Figure 4:
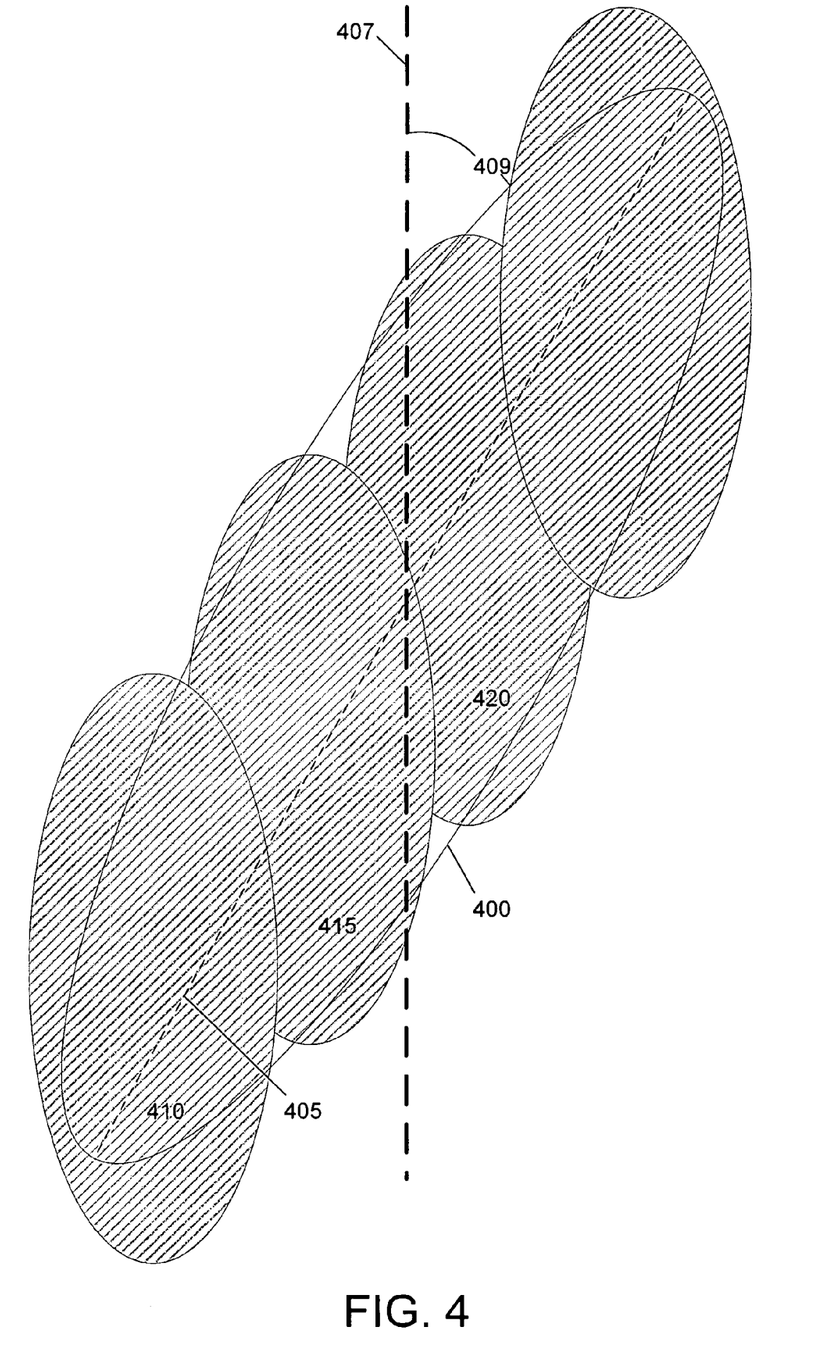
FIG. 4 illustrates an implementation of texture sampling according to an embodiment of the invention.

In a further embodiment, step 335 uses a modified footprint assembly technique using an available alternate ripmap selected in step 325. The modified footprint assembly technique reduces the number of samples required to approximate the desired anisotropic texture sample. FIG. 4 illustrates an example implementation of the modified footprint assembly technique of step 335. Pixel footprint 400 represents the desired texture sample area, for example an 8:1/1:1 level of anisotropy. Pixel footprint 400 has an axis of anisotropy 405. In an embodiment, axis of anisotropy 405 is aligned with the dimension of anisotropy 407 of the ripmap, or alternatively, as shown in FIG. 4, within an angular threshold 409 of the dimension of anisotropy 407 of the ripmap. The modified footprint assembly technique approximates the pixel footprint 400 using texture samples from an alternate available ripmap, rather than from a mipmap. Step 335 selects texture samples from the alternate ripmap along the axis of anisotropy 405, such as texture samples 410, 415, 420, and 425.

As projected back into the base texture space, texture samples from the ripmap are elliptical in shape. Because the texture samples from the alternate ripmap closely match the shape of the pixel footprint 400, less texture samples are needed to approximate the pixel footprint 400. For example, if an 8:1/1:1 level of anisotropy is desired, but the associated ripmap is unavailable, a 2:1/1:1 ripmap can be selected by step 325. Step 335 can then approximate the 8:1/1:1 pixel footprint using four samples from the 2:1/1:1 ripmap. In comparison, using footprint assembly to approximate an 8:1/1:1 pixel footprint using a 1:1 mipmap requires eight texture samples.

Following step 335, step 340 evaluates the ripmap statistics computed in step 320 to determine whether additional ripmaps should be created. In an embodiment, step 340 creates a ripmap if the associated statistics exceed a threshold value. For example, if a 8:1/1:1 ripmap is frequently selected, but is unavailable, the associated ripmap statistic will eventually rise above a threshold value. Consequently, step 340 will create the 8:1/1:1 ripmap.

In a further embodiment, the threshold value for each ripmap may vary according to amount of anisotropy in the ripmap. For example, because blurring artifacts are most visible for surfaces at very oblique angles to the image plane, ripmaps having high degrees of anisotropy, such as 8:1, 16:1, and 32:1, often provide the largest relative visual benefit. Additionally, these ripmaps consume substantially less memory than less anisotropic ripmaps, such as 2:1 and 4:1. Therefore, an embodiment of step 340 sets the threshold for creating ripmaps of high anisotropy at a lower level than for ripmaps of lower anisotropy. In a yet a further embodiment, step 340 is performed, at least in part, by a graphics driver. The graphics driver enables flexible criteria to be applied to determine whether additional ripmaps should be created. Examples of criteria used by a graphics driver include the level of anisotropy, the size of the ripmap, the amount of texture memory available, and the demands of the graphics application (e.g. favor horizontally orientated anisotropy over vertically orientated anisotropy for graphics applications with large texture mapped wall surfaces).

Figure 5:
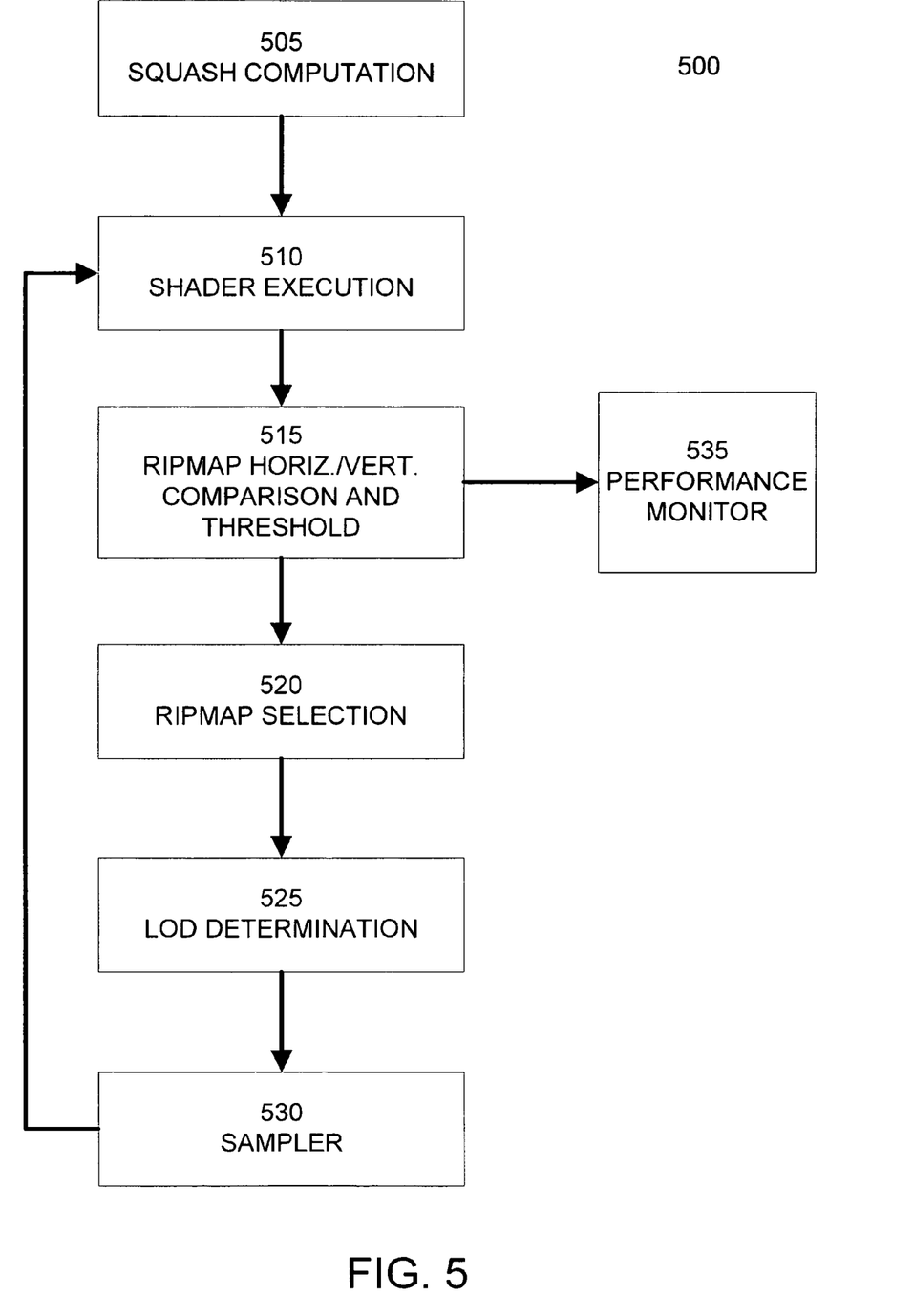
FIG. 5 illustrates a portion of a graphics processing unit according to an embodiment of the invention.

FIG. 5 illustrates a portion 500 of a graphics processing unit according to an embodiment of the invention. A squash computation unit 505 receives a group of pixels, for example a pixel quad, from a rasterizer portion of the graphics processing unit. Squash computation unit 505 computes a squash value for the group of pixels. In an embodiment, the squash computation is determined from the ratio of texture coordinate distances in the horizontal and vertical directions. This ratio may be rounded or truncated to determine a squash value.

Shader execution unit 510 receives the group of pixels and the associated squash value and may be used to execute one or more pixel shader programs. Inputs to pixel shader programs can include texture coordinates, texture values, and pixel values. The shader unit 510 outputs a modified group of pixels, for example having modified pixel values, depth values, alpha values, or texture coordinates, to the ripmap threshold unit 515.

Ripmap threshold unit 515 determines if the axis of anisotropy for the pixel footprints is within a threshold of either the vertically or horizontally orientated ripmaps. In an embodiment, ripmap threshold unit 515 computes an approximate axis of anisotropy, rather than solving an equation defining the major axis for an elliptical pixel footprint. Ripmap threshold unit 515 determines an ideal ripmap to be used, if available.

The ripmap selected by ripmap threshold unit is used to update ripmap statistics maintained by performance monitor 535. An embodiment of performance monitor 535 maintains counters for each ripmap in a texture set. The counters of the performance monitor may be accessed by a graphics driver to determine whether to create additional ripmaps for a base texture map.

Ripmap selection unit 520 selects an available ripmap having an appropriate amount of anisotropy based upon the squash value, the axis of anisotropy, and the set of available ripmaps for a base texture. Ideally, the ripmap selected by ripmap threshold unit 515 is available and therefore is selected as the texture for the group of pixels. However, ripmap selection unit 520 can select an alternate available ripmap if the previously selected ripmap is unavailable. In a further embodiment, a mipmap may be selected if the axis of anisotropy is outside the threshold or there are no closely matching ripmaps available. In an embodiment, ripmap selection unit uses a bit mask associated with the base texture to determine which ripmaps are available.

Level of detail (LOD) determination unit 525 determines a texture minification level, or LOD, for the selected texture. In an embodiment, the texture minification level is the log base 2 of the length of the minor axis of the pixel footprint. Based upon the texture minification level, the selected texture map, and the texture coordinates of the group of pixels, the texture state values, such as the texture base address and texture width and length, are set to match the selected texture.

Sampler 530 determines texture sample values for the group of pixels. For a ripmap matching the level of anisotropy and orientation of the pixel footprint, sampler 530 determines a texture sample value from a ripmap sample. For ripmaps with different levels of anisotropy or orientations from the pixel footprint, the sampler 530 determines a texture sample value from multiple ripmap samples along the axis of anisotropy (or as discussed above, an approximation of the axis of anisotropy). Similarly, for mipmaps selected as a texture, sampler 530 determines texture sample values from one or more mipmap samples along the axis of anisotropy. Sampler 530 is connected with texture memory, which may include one or more texture caches, to read the values of the selected texture. The output of sampler 530 may optionally be sent back to shader execution unit 510 or output to a frame buffer for display.

This invention provides an efficient system for anisotropically sampling texture maps without decreasing performance or consuming an inordinate amount of texture memory. Although the invention has been discussed with respect to specific examples and embodiments thereof, these are merely illustrative, and not restrictive, of the invention. Thus, the scope of the invention is to be determined solely by the claims.

What is claimed is:

1. A method for rendering an image for display, the method comprising:
  a computer system executing the following steps:

computing a squash value representing a desired amount of anisotropy for an anisotropic texture sample;

identifying a desired texture map using the squash value, wherein the desired texture map is a ripmap included in a set of potential ripmaps associated with a base texture and having the desired amount of anisotropy;

determining whether the desired texture map is included in a set of available ripmaps;

in response to a determination that the desired texture map is included in the set of available ripmaps, selecting the desired texture map as a selected texture map;

in response to a determination that the desired texture map is not included in the set of available ripmaps, selecting an alternate texture map as the selected texture map, wherein the alternate texture map is an alternate ripmap included in the set of available ripmaps;

modifying a texture state value to match an attribute of the selected texture map;

sampling the selected texture map to determine an anisotropic texture sample value;

using the anisotropic texture sample value to generate a pixel of an image to be displayed;

updating a set of ripmap usage statistics associated with the set of potential ripmaps based on the desired texture map, wherein the set of ripmap usage statistics reflects a frequency of identification of a potential ripmap from the set of potential ripmaps as the desired texture map; and adding a new ripmap to the set of available ripmaps based on the ripmap usage statistics.

2. The method of claim 1, wherein the squash value is computed from the texture coordinates associated with a group of texture samples.

3. The method of claim 1, wherein selecting a texture map includes using an orientation of the anisotropic texture sample.

4. The method of claim 1, wherein the texture state value is a texture base address.

5. The method of claim 1, wherein the texture state value is a texture map width.

6. The method of claim 1, wherein the texture state value is a texture map height.

7. The method of claim 1, wherein sampling further includes determining the anisotropic texture sample value from a plurality of texture samples from the selected texture map, wherein the plurality of texture samples are arranged to approximate the anisotropic texture sample.

8. The method of claim 1, wherein adding a new ripmap to the set of available ripmaps includes:

creating the new ripmap from the set of potential ripmaps associated with the base texture.

9. The method of claim 1, wherein updating adding a new ripmap to the set of available ripmaps based on the ripmap usage statistics includes determining whether at least one of the set of ripmap statistics exceeds a threshold value.

10. The method of claim 9, wherein the threshold value is based upon a relative visual benefit associated with at least one of the set of potential ripmaps.

11. The method of claim 9, wherein the threshold value is based upon a size of at least one of the set of potential ripmaps.

12. The method of claim 1, wherein determining whether the desired texture map is included in a set of available ripmaps includes an analysis of a bit mask enumerating an availability of each one of the set of potential ripmaps.

13. A graphics processing subsystem adapted to compute an anisotropic texture sample value, the graphics processing subsystem comprising:

a squash computation unit adapted to compute a squash value representing a desired amount of anisotropy for an anisotropic texture sample;

a ripmap threshold unit adapted to identify a desired ripmap from a set of potential ripmaps based at least in part on the squash value;

a ripmap selection unit adapted to select an available ripmap from a set of available ripmaps based upon the desired ripmap, the ripmap selection unit being adapted to select the desired ripmap as the available ripmap in the event that the desired ripmap is in the set of available ripmaps and to select an alternate ripmap as the available ripmap in the event that the desired ripmap is not in the set of available ripmaps;

a sampler adapted to compute an anisotropic texture sample value from the available ripmap and a set of texture state values;

a performance monitoring unit adapted to track a frequency of identification of desired ripmaps from the set of potential ripmaps by the ripmap threshold unit; and a graphics driver, stored in a computer readable medium, that when executed is adapted to add a new ripmap to the set of available ripmaps based on the frequency of identification of desired ripmaps.

14. The graphics processing subsystem of claim 13, further adapted to modify the set of texture state values in response to the selection of the available ripmap.

15. The graphics processing subsystem of claim 14, wherein the texture state values include a texture width.

16. The graphics processing subsystem of claim 14, wherein the texture state values include a texture height.

17. The graphics processing subsystem of claim 13, wherein the squash computation unit is adapted to compute the squash value from a set of texture coordinates associated with a quad of pixels.

18. The graphics processing subsystem of claim 13, wherein the ripmap threshold unit is adapted to compute an approximate axis of anisotropy used to identify the desired ripmap.

19. The graphics processing subsystem of claim 13, wherein the performance monitoring unit includes a plurality of counters, each counter associated with one of the set of potential ripmaps.

20. The graphics processing subsystem of claim 19, wherein the graphics driver is further adapted to read the counters.

21. The graphics processing subsystem of claim 13, further comprising a texture memory in communication with the sampler and adapted to store the set of available ripmaps.

22. The graphics processing subsystem of claim 13, wherein the graphics driver is adapted to:

create the new ripmap from the set of potential ripmaps.

23. The graphics processing subsystem of claim 13, wherein executing the graphics driver comprises a central processing unit executing a driver program for the graphics processing subsystem.

* * * * *